(12) United States Patent
Schreiber

(10) Patent No.: US 8,100,662 B2
(45) Date of Patent: Jan. 24, 2012

(54) FAN BLADE MADE OF A TEXTILE COMPOSITE MATERIAL

(75) Inventor: Karl Schreiber, Am Mellensee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1103 days.

(21) Appl. No.: 11/907,958

(22) Filed: Oct. 18, 2007

(65) Prior Publication Data
US 2008/0187441 A1 Aug. 7, 2008

(30) Foreign Application Priority Data
Oct. 18, 2006 (DE) .......................... 10 2006 049 818

(51) Int. Cl.
F01D 5/14 (2006.01)
(52) U.S. Cl. ..................... 416/230; 416/241 R; 416/248
(58) Field of Classification Search .................. 416/230, 416/241 R, 248
See application file for complete search history.

(56) References Cited

U.S. PATENT DOCUMENTS

| | | | | |
|---|---|---|---|---|
| 3,123,841 | A | * | 3/1964 | Wider ............................ 114/354 |
| 3,664,764 | A | | 5/1972 | Davies |
| 3,679,324 | A | * | 7/1972 | Stargardter ............... 416/229 R |
| 3,752,600 | A | | 8/1973 | Walsh et al. |
| 4,040,770 | A | | 8/1977 | Carlson |
| 4,363,602 | A | | 12/1982 | Martin |
| 5,375,978 | A | * | 12/1994 | Evans et al. ................... 416/230 |
| 5,573,377 | A | | 11/1996 | Bond |
| 6,290,446 | B1 | | 9/2001 | Warkotsch et al. |
| 6,290,466 | B1 | | 9/2001 | Ravenhall et al. |
| 2005/0084379 | A1 | | 4/2005 | Schreiber |

FOREIGN PATENT DOCUMENTS

| | | |
|---|---|---|
| CH | 5 36 183 A | 4/1973 |
| DE | 2240970 | 6/1973 |
| DE | 30 40 129 C2 | 9/1981 |
| DE | 103 26 719 | 12/2004 |
| GB | 1 375 327 | 11/1974 |
| GB | 15 36 899 | 12/1978 |

OTHER PUBLICATIONS

European search report dated Nov. 29, 2010 for counterpart patent application.
European search report dated Nov. 29, 2010 for counterpart patent application.

* cited by examiner

Primary Examiner — Ninh H Nguyen
(74) Attorney, Agent, or Firm — Timothy J. Klima; Shuttleworth & Ingersoll, PLC

(57) ABSTRACT

A gas-turbine engine fan blade made of a textile composite material includes short carbon fiber intermediate layers (8) for forming the blade root arranged between splayed carbon fiber layers (7) in the blade root (2). In a compressive stress-affected zone (11) of the blade root, the fiber layers extend parallel to the flanks (12) of the blade root. The diversion of the carbon fiber layers (7) up to the splayed area is effected in a transition area (13). A glass fiber outer layer (10) arranged on the flanks (12) of the blade root gradually runs out at a transition zone (15) of the transition area (13), this zone being diverted at a certain radius. Between the glass fiber outer layer and the outer carbon fiber layer there is a carbon fiber layer (9) oriented at +/−45°.

19 Claims, 2 Drawing Sheets

FAN BLADE MADE OF A TEXTILE COMPOSITE MATERIAL

Figure 1:
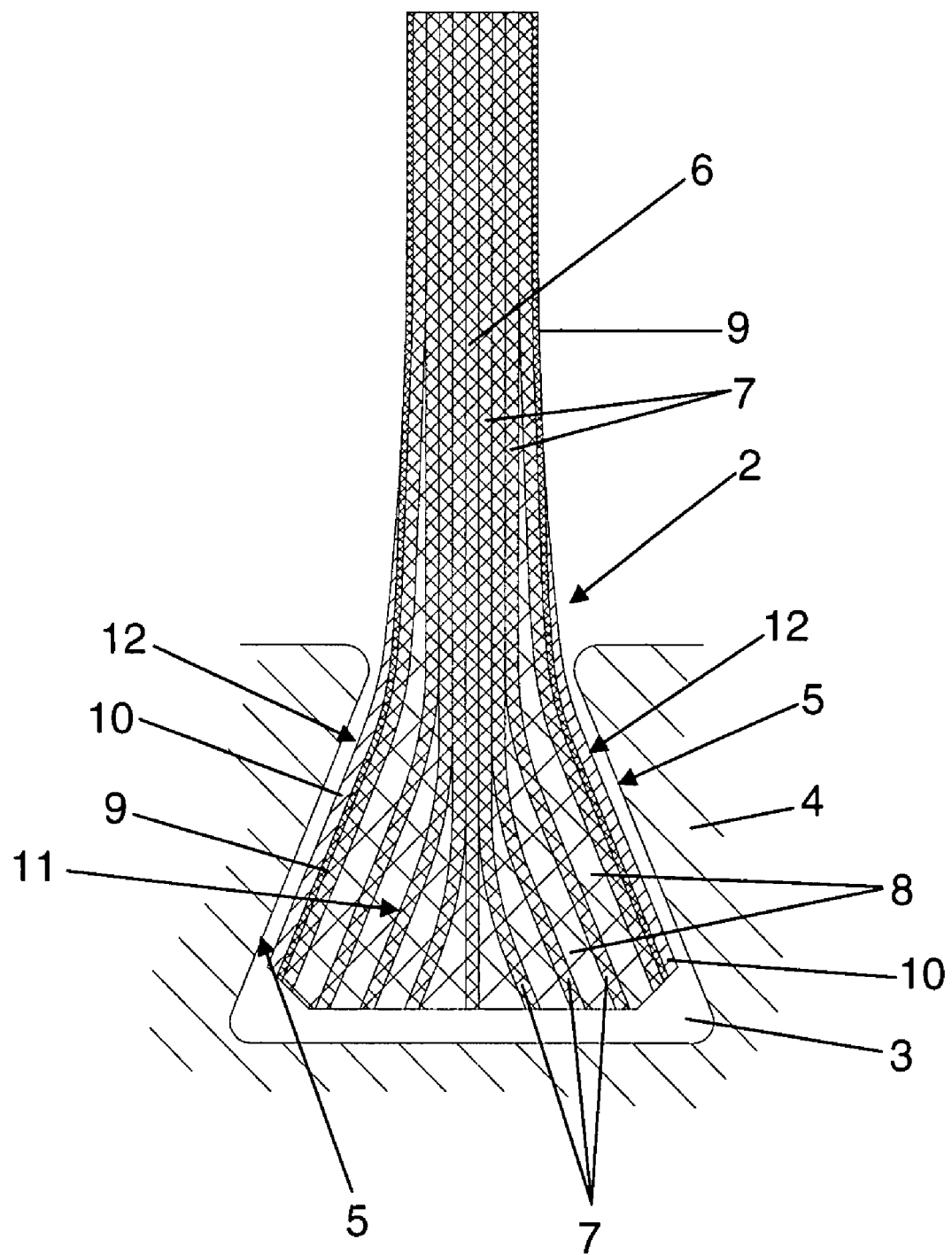

This application claims priority to German Patent Application DE 10 2006 049 818.6 filed Oct. 18, 2006, the entirety of which is incorporated by reference herein. This invention relates to a gas-turbine engine fan blade which is made of a textile composite material and comprises an airfoil and a blade root retained in recesses of a rotor disk.

It is already known to make the fan blades of turbofan gas-turbine engines in textile composite material provided with a metallic sheathing, i.e. a plurality of fiber layers embedded in plastic. Usually, fan blades made of textile composite material are sheathed with sheet metal or are made of titanium at least on the leading edge. The blade is retained in a conformal recess on the outer circumference of a rotor disk via a dovetail-shaped blade root.

High centrifugal forces resulting from high blade tip velocity, gas pressure, vibrations excited by the flow medium or impinging foreign bodies subject the blades to extreme loads. The high tensile forces resulting therefrom must be taken up by the airfoil, transmitted to the blade root and finally be borne by the rotor disk. Due to the reduced packing density of the fiber layers in the blade root which splays from the airfoil in the form of a dovetail, the pressure forces acting in this area cannot be transmitted between the fiber layers, as a result of which delamination of the fiber layers in the blade root may occur. Safety of attachment of the fan blades on the circumference of the rotor disk is, therefore, not ensured.

On a compressor blade made of a fiber material known from Specification U.S. Pat. No. 4,040,770, reinforcing wedges in a homogenous material, for example titanium, are provided in the area of the dovetail-shaped blade root between the fiber layers to provide a load-carrying structure in this highly-stressed area. On the outside of the blade root, a support in the same homogenous material is provided to protect the fiber layers and effect a uniform load transfer between the blade root and the rotor disk.

According to Specification DE 103 26 719, a reinforcing wedge which originates at the bottom of the metal-sheathed blade root is incorporated in the fiber composite core of the latter, with this core consisting of a plurality of carbon fiber layers embedded in synthetic resin. The reinforcing wedge longitudinally divides the blade root in two partial branches to ensure high strength also in the area spreading out from the airfoil and enable the high tensile forces acting upon the airfoil to be effectively transmitted into the blade root.

The metallic wedges and the metallic sheathing considerably affect the weight of the blades. A further problem is the attachment of the reinforcing wedges in the blade root. The reinforcing wedges may become detached, as a result of which power transmission and safety of retention of the blades is not ensured. Furthermore, the reinforcing wedges cause critical stress excesses.

For turbofan gas-turbine engines, maximum tip velocity and minimum size are further objectives to be accomplished for the fan made of fiber composite material, to reduce weight and cost and improve efficiency. For this, the fiber composite material must have adequate strength, in particular in the load-carrying blade root.

The present invention, in a broad aspect, provides textile composite fan blades for a turbofan gas-turbine engine which, in the area of the blade root, are designed such that high strength and safe transmission into the rotor disk of the forces acting upon the blade are ensured, thereby enabling safe retention and long service-life of the fan blades.

According to the present invention, the blade comprises a plurality of carbon fiber layers with carbon fiber intermediate layers disposed in the splaying area of the carbon fiber layers to shape the blade root and with glass-fiber outer layers provided on the outer surfaces of the blade root. The carbon fiber layers, starting out from the carbon fiber layers extending parallel to the blade axis in the airfoil, form an airfoil root which tapers in the blade root and a both-side transition area with an outer, load-adequate transition zone for diverting, with low bending stress, the respective carbon fiber layers into the splayed area of the blade root and, in the portion of the blade root situated in the recess of the rotor disk, a compressive stress-affected zone in which the carbon fiber intermediate layers are disposed and in which the carbon fiber layers extend parallel to the flanks in the splayed area of the blade root. The side faces of the blade root are covered with a ductile glass-fiber outer layer.

The radius in the transition area is designed such that critical bending stresses are avoided. Via the glass-fiber outer layer, the compressive forces are, rectangularly to the fiber layers, introduced into the compressive stress-affected zone in the blade root in which the carbon fiber layers extend parallel to the flanks, i.e. are no longer diverted, to enable the compressive strength of the carbon fiber layers to be fully utilized and enable high compressive stress to be taken up in the compressive stress-affected zone. Since, according to the present invention, the plastic share between the plastic fiber layers in the compressive stress-affected zone is kept low by means of the intermediate layers and by way of the suppressed infiltration of plastic effected by application of local pressure during manufacture in this area, forces can be transmitted directly between the fiber layers. Concurrently, reduction in strength and sudden stiffness changes are avoided.

According to a further important feature of the present invention, the quasi unidirectionally reinforced carbon fiber-plastic carrying structure is covered with a +/−45° carbon fiber layer extending between the carrying structure and the glass fiber outer layer to improve the torsional strength of the blade and further improve force introduction into the quasi unidirectionally reinforced carbon fiber-plastic carrying structure in the flank area of the blade root.

This form of a high-strength blade root area made of a textile composite material ensures safe attachment of the blade to the rotor disk. The axial forces and bending loads acting upon the blade are transmitted to, and taken up, by the blade root. Delamination of the fiber layers and detachment of the flanks is avoided. While smaller in size and lower in weight, the fan can be operated with appropriately high rotational speed.

According to another important feature of the present invention, the glass fiber outer layer covers the blade root flank up to the transition area and runs out into the load-adequate transition zone with decreasing layer thickness to avoid detachment of the flank due to high compressive stressing in the blade root. Detachment of the flank and delamination in the transition area can further be counteracted by reinforcing the fiber layers with pointed glass or carbon fiber-plastic pins in thickness direction.

According to still another feature of the present invention, the carbon fiber layers are diverted from the airfoil into the blade root using a transition radius which avoids critical bending stresses, actually one corresponding to the curvature of an ellipse with an ellipse ratio of 3:1 in the load-adequate transition zone. In the compressive stress-affected zone, however, the fiber layers extend parallel to the flanks, i.e. they take a straight course. In accordance with the fiber layers running parallel to the flank in the compressive stress-affected zone and diverting in the transition area, the carbon fiber intermediate layers extend with different length and gradually decreasing layer thickness into the transition area.

Manufacture of the blade according to the present invention is accomplished by infiltration of plastic in a mold with fiber layers laid up on the blade root, with a local pressure being applied in the area of the blade root which exceeds the pressure for infiltration of the synthetic resin. This results in a compression of the fiber layers and an increase in composite strength in this area. The fiber layers closely lie on each other to improve pressure transmission in the blade root, thus providing for safe retention of the blade during engine operation. Also, the blade root must subsequently be machined at the outer surface.

Figure 2:
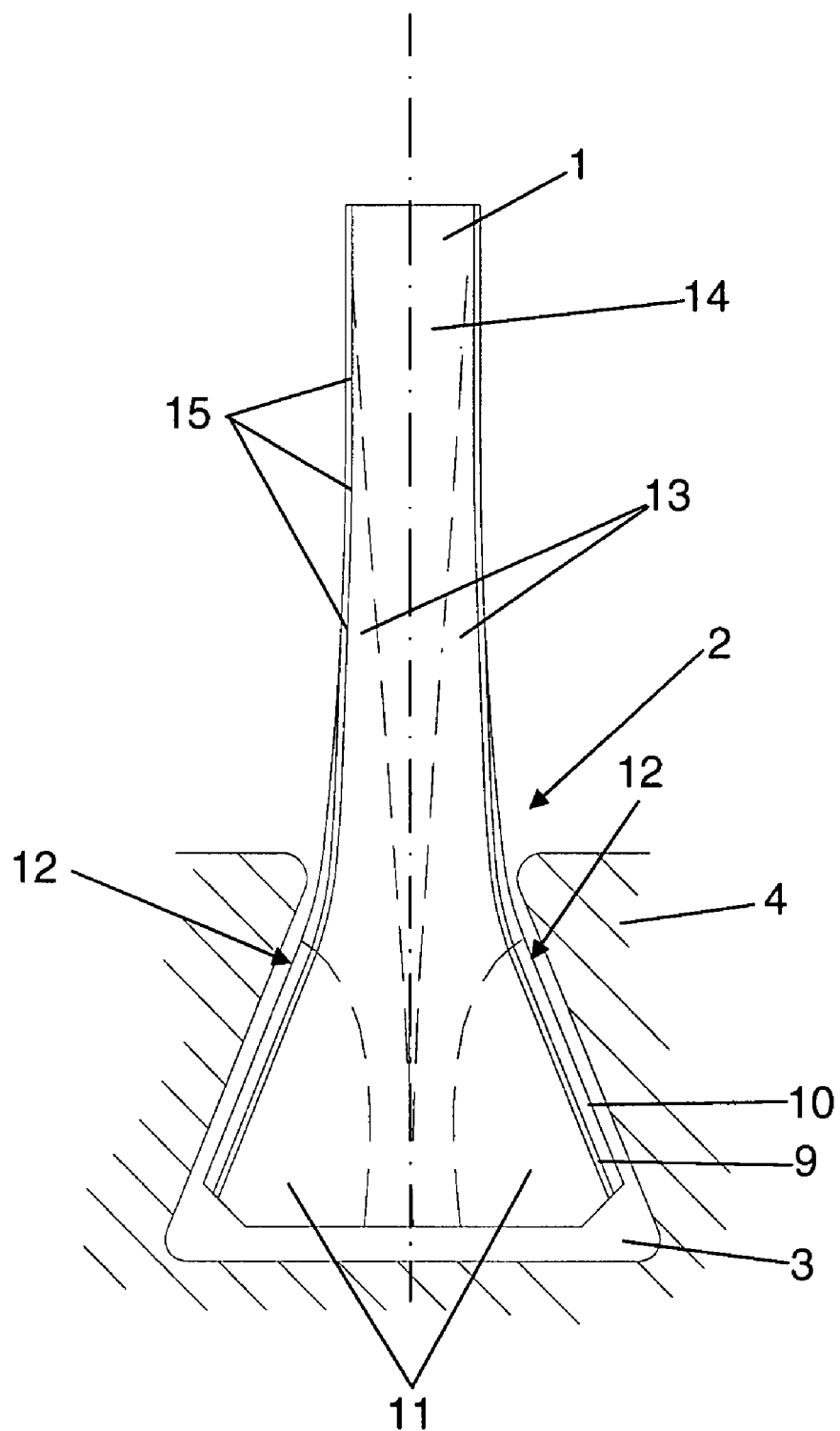

The present invention is more fully described in the light of the accompanying drawings, showing a preferred embodiment. In the drawings, FIG. 1 is a sectional view of a fan blade root arranged in a recess of a rotor disk, and FIG. 2 is a view of the blade root in accordance with FIG. 1 with the transition area achieved by a specific fiber layer arrangement and the compressive stress-affected zone.

A blade root 2 extending from an airfoil 1, which is only partly shown, is located in a recess 3 of a rotor disk 4. The blade root 2 comprises a quasi unidirectionally reinforced carbon fiber-plastic carrying structure 6, which extends into the airfoil 1 and which includes a plurality of adjacent carbon fiber layers 7 infiltrated with plastic. The carbon fiber layers 7 extend over the entire length of the fan blade, i.e. from the airfoil 1 to the bottom of the blade root 2, actually, as shown in FIG. 2, partly into an airfoil root 14 tapering towards the blade root 2. At the start of the airfoil root 14, an outer, load-adequate transition zone 15 (soft transition zone) of a transition area 13 begins in which the first-outer-carbon fiber layers 7 for the formation of the blade root 2 already divert outward with a certain curvature to gradually transit from the parallel relationship with the airfoil axis into a parallel relationship with the straight flanks 12 of the blade root 2. The transition radius of the carbon fiber layers 7 in the transition area 13 is selected such that critical bending stresses are avoided. For optimum load transfer into the blade root 2 and to reduce the delamination tendency, the transition in the outer, load-adequate transition zone 15 corresponds to the curvature of a part of an ellipse with the ellipse ratio of approximately and preferably 3:1. No diversion is made in the compressive stress-affected zone 11 provided in the blade root 2 in which the fiber layers extend parallel to the flanks 5, 12 of the recess 3 or the blade root 2, respectively.

In the blade root 2, actually essentially confined to the portion situated in the recess 3, carbon fiber intermediate layers 8 are provided between the carbon fiber layers 7. The carbon fiber intermediate layers 8 provide for splaying of the carbon fiber layers 7 in accordance with the geometry of the blade root 2 and prevent resin-rich areas from being formed during plastic infiltration, thus avoiding strength reductions and sudden stiffness changes in this area. The carbon fiber intermediate layers 8 have different lengths, actually such that the carbon fiber layers 7 and the carbon fiber intermediate layers 8 extend parallel to the flanks 12 of the blade root 2 in the compressive stress-affected zone 11, to fully utilize the-limited-compressive strength of the carbon fiber layers and the carbon fiber intermediate layers.

On the outer surfaces of the quasi-unidirectional carbon fiber-plastic carrying structure 6, a +/−45° carbon fiber layer 9 is provided whose fiber direction is oriented at an angle of +45° and −45° relative to the fiber direction of the carbon fiber plastic carrying structure 6. The +/−45° carbon fiber layer 9 serves to improve force introduction into the quasi unidirectionally reinforced carbon fiber-plastic carrying structure 6.

Finally, the flanks 12 of the blade root 2 are each covered with a glass-fiber outer layer 10 which extends beyond the compressive stress-affected zone 11 formed by the parallel fiber layers into the transition area 13. The thickness of the glass fiber outer layer 10 gradually decreases in the transition area to avoid premature detachment of the flank in the transition zone 15 due to the blade root 2 drooping under high compressive stress.

Detachment in the area of the flanks 12 and delamination in the transition area 13 can further be avoided by reinforcing the carbon fiber layers 7 in the transition area 13 in thickness direction by means of pointed carbon fiber-plastic pins (not shown). Manufacture of the fan blade in a textile composite material is accomplished by laying up a plurality of the above-described fiber layers 7 to 10 and fiber pins in a mold in the above-described arrangement and subsequently infiltrating a synthetic resin into the closed mould under pressure. During infiltration of the synthetic resin, local pressure is, however, applied at the blade root 2 in the area of the flanks 12 or the compressive stress-affected zone 11, respectively, which exceeds, and counteracts, the infiltration pressure of the synthetic resin, as a result of which the fiber layers in the blade root closely lie on each other to ensure efficient pressure transfer in this area. While the infiltrated blade area already possesses the required surface structure, the surface of the blade root 2 immediately subjected to a pressure medium during manufacture is subsequently machined.

LIST OF REFERENCE NUMERALS

1 Airfoil
2 Blade root
3 Recess in 4
4 Rotor disk
5 Flank of 3
6 Carbon fiber-plastic carrying structure
7 Carbon fiber layers of 6
8 Carbon fiber intermediate layers
9 +/−45° carbon fiber layers
10 Glass fiber outer layer
11 Compressive stress-affected zone
12 Flanks of 2
13 Transition area
14 Airfoil root
15 Outer, load-adequate transition zone of 13

What is claimed is:

1. A gas-turbine engine fan blade made of a textile composite material, which turbine blade comprises an airfoil and a blade root for retention in a recess of a rotor disk, the turbine blade comprising:
   a plurality of carbon fiber layers extending parallel to an airfoil axis in the airfoil and also forming:
      a quasi unidirectionally reinforced carbon fiber-plastic carrying structure,
      an airfoil root tapering in the blade root,
      a transition area which extends from a start of the airfoil root on both sides, and in which the carbon fiber layers are diverted from a position parallel to the airfoil axis via an outer, load-adequate transition zone to a position splayed in accordance with a geometry of the blade root, and
      a compressive stress-affected zone, in which the previously diverted carbon fiber layers extend parallel to flanks of the blade root positioned in the recess of the rotor disk, with a plurality of carbon fiber intermediate layers individually arranged between the splayed carbon fiber layers, a glass fiber outer layer positioned on each flank of the blade root; and a further carbon fiber layer, having a fiber orientation of +/−45° to a fiber orientation of the carbon fiber layers of the carrying structure, positioned between the carrying structure and each glass fiber outer layer.

2. The fan blade in accordance with claim 1, wherein the glass fiber outer layer extends along the flanks of the blade root to the transition area.

3. The fan blade in accordance with claim 2, wherein the glass fiber outer layer gradually tapers out into the load-adequate transition zone with decreasing layer thickness.

4. The fan blade in accordance with claim 3, wherein a transition radius of the fiber layers in the transition zone corresponds to a curvature of an ellipse with an ellipse ratio of approximately 3:1.

5. The fan blade in accordance with claim 4, wherein the transition radius of the fiber layers in the transition zone corresponds to a curvature of an ellipse with an ellipse ratio of 3:1.

6. The fan blade in accordance with claim 5, wherein the carbon fiber intermediate layers extend with different length and with decreasing layer thickness into the transition area in accordance with the geometry of the compressive stress-affected zone.

7. The fan blade in accordance with claim 6, wherein a plastic proportion between the fiber layers in the compressive stress-affected zone is lower than in blade areas not subjected to local pressure, because of increased compression in this area during plastic infiltration.

8. The fan blade in accordance with claim 7, further comprising pointed glass or carbon fiber-plastic pins to reinforce the carbon fiber layers in the transition area in a thickness direction.

9. The fan blade in accordance with claim 1, wherein the glass fiber outer layer extends along the flanks of the blade root to the transition area.

10. The fan blade in accordance with claim 9, wherein the glass fiber outer layer gradually tapers out into the load-adequate transition zone with decreasing layer thickness.

11. The fan blade in accordance with claim 10, wherein a transition radius of the fiber layers in the transition zone corresponds to a curvature of an ellipse with an ellipse ratio of approximately 3:1.

12. The fan blade in accordance with claim 11, wherein the transition radius of the fiber layers in the transition zone corresponds to a curvature of an ellipse with an ellipse ratio of 3:1.

13. The fan blade in accordance with claim 12, wherein the carbon fiber intermediate layers extend with different length and with decreasing layer thickness into the transition area in accordance with the geometry of the compressive stress-affected zone.

14. The fan blade in accordance with claim 13, wherein a plastic proportion between the fiber layers in the compressive stress-affected zone is lower than in blade areas not subjected to local pressure, because of increased compression in this area during plastic infiltration.

15. The fan blade in accordance with claim 1, wherein the carbon fiber intermediate layers extend with different length and with decreasing layer thickness into the transition area in accordance with the geometry of the compressive stress-affected zone.

16. A gas-turbine engine fan blade made of a textile composite material, which turbine blade comprises an airfoil and a blade root for retention in a recess of a rotor disk, the turbine blade comprising:

a plurality of carbon fiber layers extending parallel to an airfoil axis in the airfoil and also forming:
    a quasi unidirectionally reinforced carbon fiber-plastic carrying structure,
    an airfoil root tapering in the blade root,
    a transition area which extends from a start of the airfoil root on both sides, and in which the carbon fiber layers are diverted from a position parallel to the airfoil axis via an outer, load-adequate transition zone to a position splayed in accordance with a geometry of the blade root, and
    a compressive stress-affected zone, in which the previously diverted carbon fiber layers extend parallel to flanks of the blade root positioned in the recess of the rotor disk, with
a plurality of carbon fiber intermediate layers individually arranged between the splayed carbon fiber layers, and
a glass fiber outer layer positioned on each flank of the blade root,
wherein a transition radius of the fiber layers in the transition zone corresponds to a curvature of an ellipse with an ellipse ratio of approximately 3:1.

17. The fan blade in accordance with claim 16, wherein the transition radius of the fiber layers in the transition zone corresponds to a curvature of an ellipse with an ellipse ratio of 3:1.

18. A gas-turbine engine fan blade made of a textile composite material, which turbine blade comprises an airfoil and a blade root for retention in a recess of a rotor disk, the turbine blade comprising:

a plurality of carbon fiber layers extending parallel to an airfoil axis in the airfoil anc also forming:
    a quasi unidirectionally reinforced carbon fiber-plastic carrying structure,
    an airfoil root tapering in the blade root,
    a transition area which extends from a start of the airfoil root on both sides, and in which the carbon fiber layers are diverted from a position parallel to the airfoil axis via an outer, load-adequate transition zone to a position splayed in accordance with a geometry of the blade root, and
    a compressive stress-affected zone, in which the previously diverted carbor fiber layers extend parallel to flanks of the blade root positioned in the recess of the rotor disk, with
a plurality of carbon fiber intermediate layers individually arranged between the splayed carbon fiber layers, and
a glass fiber outer layer positioned on each flank of the blade root,
wherein a plastic proportion between the fiber layers in the compressive stress-affected zone is lower than in blade areas not subjected to local pressure, because of increased compression in this area during plastic infiltration.

19. A gas-turbine engine fan blade made of a textile composite material, which turbine blade comprises an airfoil and a blade root for retention in a recess of a rotor disk, the turbine blade comprising:

a plurality of carbon fiber layers extending parallel to an airfoil axis in the airfoil and also forming:
    a quasi unidirectionally reinforced carbon fiber-plastic carrying structure,
    an airfoil root tapering in the blade root, a transition area which extends from a start of the airfoil root on both sides, and in which the carbon fiber layers are diverted from a position parallel to the airfoil axis via an outer, load-adequate transition zone to a position splayed in accordance with a geometry of the blade root, and a compressive stress-affected zone, in which the previously diverted carbon fiber layers extend parallel to flanks of the blade root positioned in the recess of the rotor disk, with a plurality of carbon fiber intermediate layers individually arranged between the splayed carbon fiber layers, a glass fiber outer layer positioned on each flank of the blade root, and pointed glass or carbon fiber-plastic pins to reinforce the carbon fiber layers in the transition area in a thickness direction.

* * * * *

UNITED STATES PATENT AND TRADEMARK OFFICE
CERTIFICATE OF CORRECTION

| | | |
|---|---|---|
| PATENT NO. | : 8,100,662 B2 | Page 1 of 1 |
| APPLICATION NO. | : 11/907958 | |
| DATED | : January 24, 2012 | |
| INVENTOR(S) | : Schreiber et al. | |

It is certified that error appears in the above-identified patent and that said Letters Patent is hereby corrected as shown below:

Title Page, Item (12) "Schreiber" should read -- Schreiber et al. --.

Title Page, Item (75) Inventor is corrected to read:
-- Karl Schreiber, Am Mellensee (DE);
Christoph Ebert, Dresden (DE);
Albert Langkamp, Dresden (DE);
Werner Hufenbach, Dresden (DE) --.

Signed and Sealed this
Fifteenth Day of September, 2015

Michelle K. Lee
*Director of the United States Patent and Trademark Office*